(12) United States Patent
Wiggeshoff

(10) Patent No.: US 11,998,849 B2
(45) Date of Patent: *Jun. 4, 2024

(54) SCANNING OF 3D OBJECTS FOR INSERTION INTO AN AUGMENTED REALITY ENVIRONMENT

(71) Applicant: Sony Interactive Entertainment LLC, San Mateo, CA (US)

(72) Inventor: Elke Wiggeshoff, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/071,191

(22) Filed: Nov. 29, 2022

(65) Prior Publication Data

US 2023/0098160 A1 Mar. 30, 2023

Related U.S. Application Data

(63) Continuation of application No. 16/917,708, filed on Jun. 30, 2020, now Pat. No. 11,514,690.

(51) Int. Cl.
| | |
|---|---|
| *A63F 13/655* | (2014.01) |
| *A63F 13/213* | (2014.01) |
| *G06N 20/00* | (2019.01) |
| *G06T 19/00* | (2011.01) |
| *G06V 10/10* | (2022.01) |
| *G06V 20/20* | (2022.01) |
| *G06V 20/64* | (2022.01) |
| *G06V 30/142* | (2022.01) |

(52) U.S. Cl.
CPC .......... *A63F 13/655* (2014.09); *A63F 13/213* (2014.09); *G06N 20/00* (2019.01); *G06T 19/006* (2013.01); *G06V 10/17* (2022.01); *G06V 20/20* (2022.01); *G06V 20/64* (2022.01); *G06V 20/647* (2022.01); *G06V 30/142* (2022.01)

(58) Field of Classification Search
CPC ..... A63F 13/213; G06T 19/006; G06V 20/64; G06V 30/142
See application file for complete search history.

(56) References Cited

U.S. PATENT DOCUMENTS 11,514,690 B2 * 11/2022 Wiggeshoff .......... G06V 20/647

* cited by examiner

*Primary Examiner* — Diane D Mizrahi
(74) *Attorney, Agent, or Firm* — Penilla IP, APC

(57) ABSTRACT

A method for inserting a virtual object into an augmented reality environment, is provided, including: capturing one or more images of a real world object; processing the one or more images to identify a type of the real world object; based on the identified type of the real world object, generating a virtual object that resembles the real world object; using the identified type of the real world object to assign a functionality to the virtual object, the functionality defining a utility of the virtual object in an augmented reality environment, wherein assigning the functionality enables an action capable of being performed by the virtual object in the augmented reality environment that provides said utility; deploying the virtual object in the augmented reality environment.

20 Claims, 11 Drawing Sheets

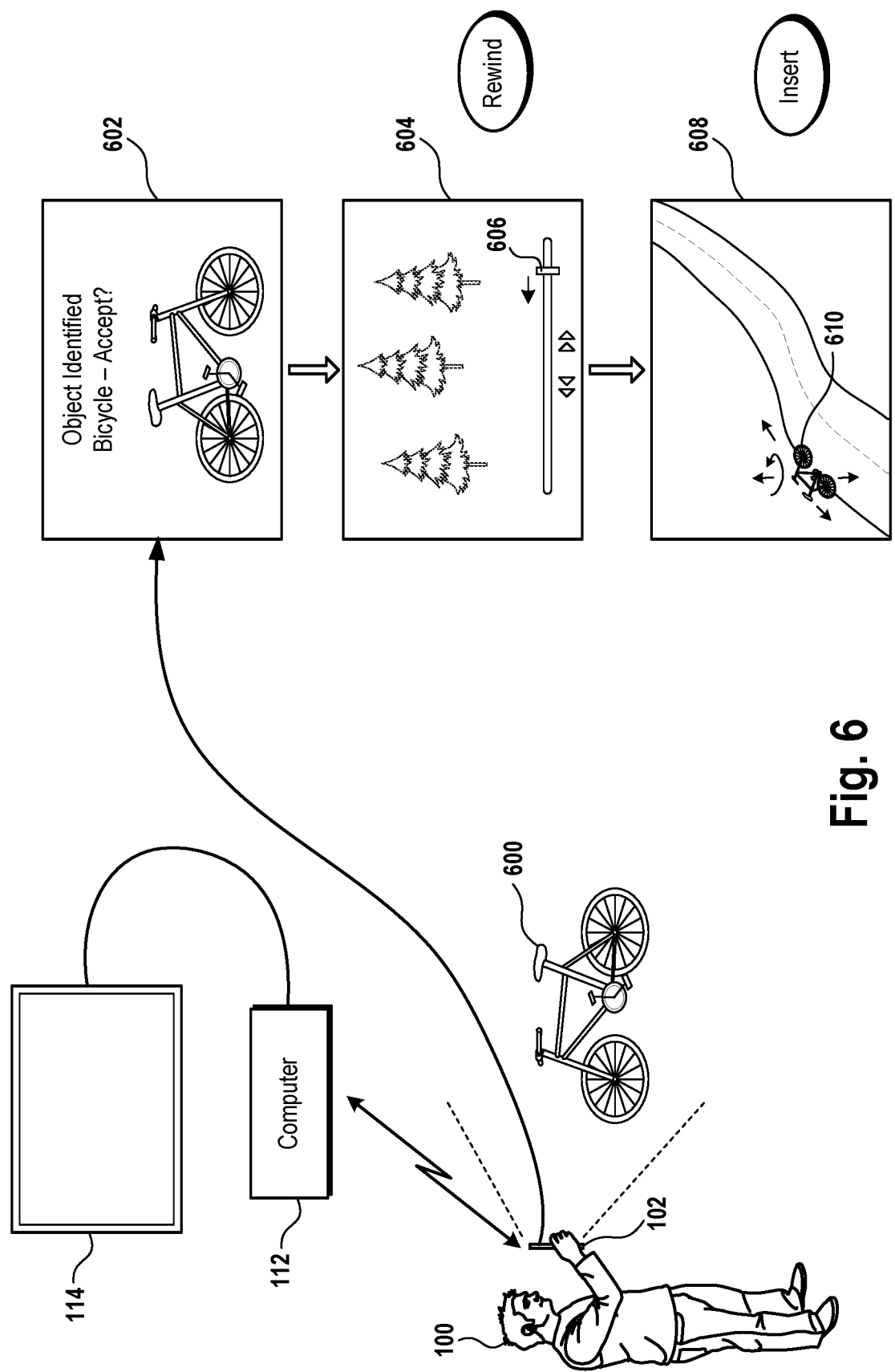

US 11,998,849 B2

SCANNING OF 3D OBJECTS FOR INSERTION INTO AN AUGMENTED REALITY ENVIRONMENT

CLAIM OF PRIORITY

The present application is a Continuation of and claims priority to and the benefit of U.S. patent application Ser. No. 16/917,708, filed on Jun. 30, 2020 (U.S. Pat. No. 11,514, 690, issued on Nov. 29, 2022), entitled "Scanning 3D Objects With a Second Screen Device for Insertion Into a Virtual Environment", the disclosure of which is herein incorporated by reference in its entirety for all purposes.

FIELD OF THE DISCLOSURE

The present disclosure relates to systems and methods for scanning of 3D objects with a second screen device for insertion into a virtual environment.

BACKGROUND

Description of the Related Art

An area of continued development in the gaming industry is that of multi-player gaming, which is capable of providing collective gaming experiences to players that are geographically remote from each other. An expanding area of the gaming industry is that of sharing gameplay video and spectating gameplay. Users are now able to record and share their gameplay through websites, social media, etc. Furthermore, users may live-stream their gameplay, so that others can view their gameplay as it occurs in substantial real-time.

Another current trend in the gaming industry is a move towards cloud gaming. Cloud gaming provides advantages to the end user by enabling remote execution of a video game in a data center where the resources for the video game can be guaranteed. The video generated by the remotely executed video game is streamed to the user's equipment, and inputs from the user are sent back to the data center. This frees the end user from the need to own specific hardware in order to execute the game itself. Rather, the end user need only possess sufficient hardware to stream the gameplay, and may still enjoy a high quality gaming experience. Furthermore, in theory, cloud gaming enables gaming from any location where network connectivity is available.

A continuing trend in the video game industry is the increased sophistication of graphics and the availability of computing resources to meet the demands of modern game engines. As video games evolve, their resolutions and frame rates continue to increase, enabling rendering of very realistic and detailed virtual environments. Additionally, the popularity of cloud gaming continues to grow, and the shift to cloud executed video games enables even greater access to high quality gaming experiences.

It is within this context that embodiments of the disclosure arise.

SUMMARY OF THE DISCLOSURE

Implementations of the present disclosure provide systems and methods for scanning of 3D objects with a second screen device for insertion into a virtual environment.

In some implementations, a method for inserting a virtual object into a virtual environment is provided, including: generating a scan of a real world object; processing the scan to identify a type of the real world object; based on the identified type of the real world object, generating a virtual object that resembles the real world object; based on the identified type of the real world object, assigning a functionality to the virtual object, the functionality defining an action capable of being performed by the virtual object in a virtual environment; deploying the virtual object in the virtual environment.

In some implementations, generating the scan of the real world object includes capturing one or more images of the real world object.

In some implementations, the one or more images of the real world object include images from multiple angles surrounding the real world object.

In some implementations, the capturing one or more images is performed by a handheld device.

In some implementations, processing the scan to identify the type of the real world object includes applying a machine learning model to recognize the type of the real world object based on the scan.

In some implementations, generating the virtual object includes obtaining a 3D model for the identified type of the real world object.

In some implementations, generating the virtual object includes applying features of the real world object to the 3D model.

In some implementations, assigning the functionality to the virtual object includes defining a mapping of the functionality to a controller input to activate the functionality.

In some implementations, deploying the virtual object in the virtual environment includes receiving user input to determine a location in the virtual environment where the virtual object is placed.

In some implementations, deploying the virtual object in the virtual environment includes receiving user input to determine a size of the virtual object in the virtual environment.

In some implementations, the virtual environment is of a video game or of a simulation.

In some implementations, a method for inserting a virtual object into a virtual environment is provided, including: receiving a 2D drawing of a real world object; processing the 2D drawing to identify a type of the real world object; based on the identified type of the real world object, generating a virtual object that resembles the real world object; based on the identified type of the real world object, assigning a functionality to the virtual object, the functionality defining an action capable of being performed by the virtual object in a virtual environment; deploying the virtual object in the virtual environment.

In some implementations, receiving the 2D drawing of the real world object includes receiving touchscreen input that creates the 2D drawing.

In some implementations, wherein processing the 2D drawing to identify the type of the real world object includes applying a machine learning model to recognize the type of the real world object based on the 2D drawing.

In some implementations, generating the virtual object includes obtaining a 3D model for the identified type of the real world object.

In some implementations, assigning the functionality to the virtual object includes defining a mapping of the functionality to a controller input to activate the functionality.

In some implementations, deploying the virtual object in the virtual environment includes receiving user input to determine a location in the virtual environment where the virtual object is placed.

In some implementations, deploying the virtual object in the virtual environment includes receiving user input to determine a size of the virtual object in the virtual environment.

In some implementations, the virtual environment is of a video game or of a simulation.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure, together with further advantages thereof, may best be understood by reference to the following description taken in conjunction with the accompanying drawings.

FIG. 6 conceptually illustrates a user interface process for inserting a virtual object into a virtual environment, in accordance with implementations of the disclosure.

DETAILED DESCRIPTION

In the following description, numerous specific details are set forth in order to provide a thorough understanding of the present disclosure. It will be apparent, however, to one skilled in the art that the present disclosure may be practiced without some or all of these specific details. In other instances, well known process steps have not been described in detail in order not to obscure the present disclosure.

Broadly speaking, implementations of the disclosure are drawn to methods and systems for scanning of three-dimensional (3D) real world objects using a second screen device, and injecting virtual representations of such objects into a video game for gameplay. The resulting virtual objects can be used, for example, to help a player of the video game or as an obstacle for an opponent. This can add an additional dimension to gameplay of the video game by bringing additional object variety to the game world, and enabling personalization and customization based on players' real-world objects. In some implementations, a 360 degree view of a real world object is recorded, and a 3D model of the object is generated based on the 360 degree view, and used to inject a corresponding virtual object into a virtual environment. The virtual object can be subject to collision detection and other aspects of virtual object interaction and representation in the virtual environment.

While implementations of the disclosure are generally described with reference to a video game, it will be appreciated that the principles and implementations described herein can be applied to any type of simulation or interactive application, such as a video game, virtual reality simulation, augmented reality application, communications application, social network application, or any other type of application or program capable of supporting the functionality described herein.

Figure 1:
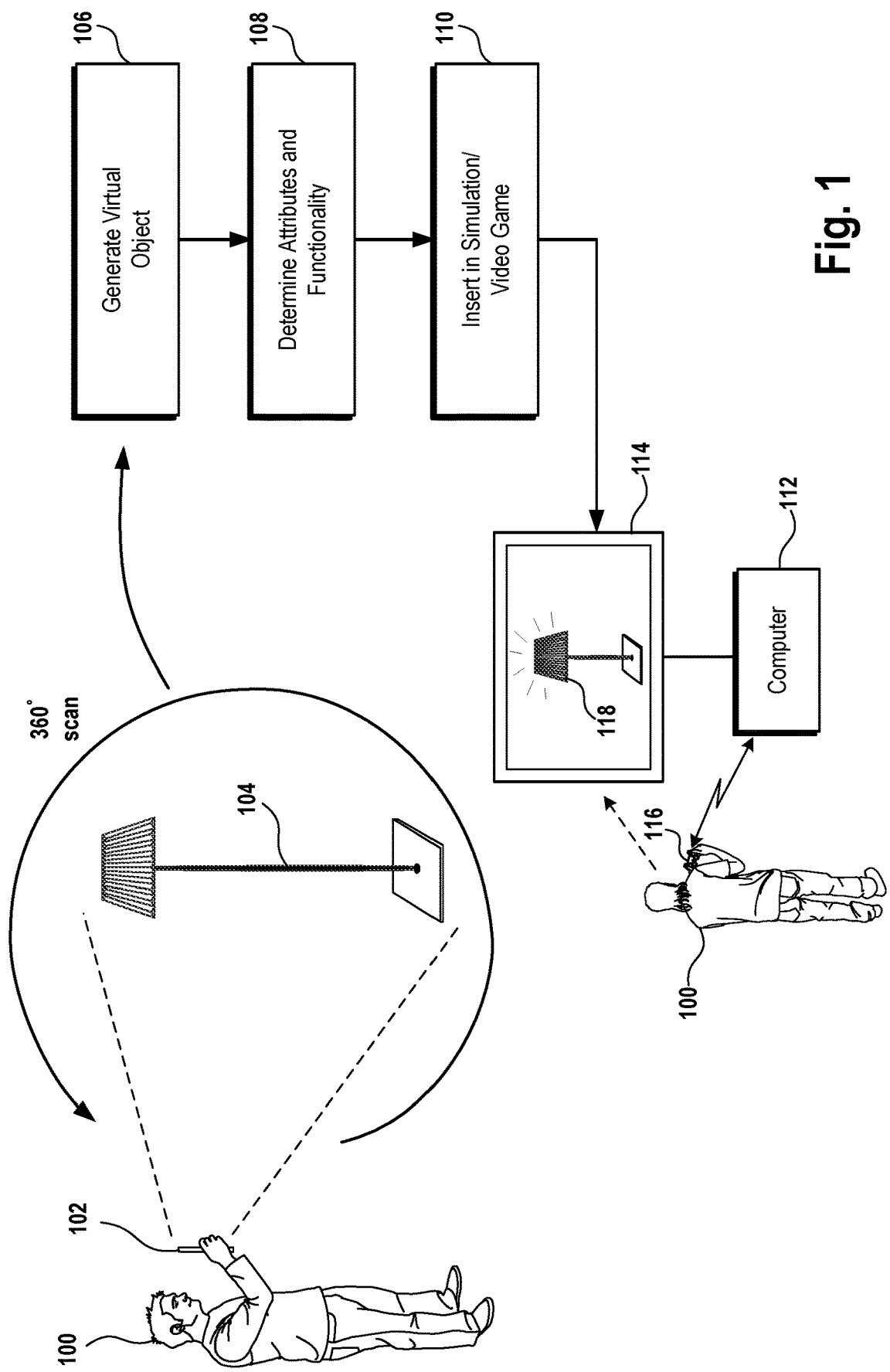
FIG. 1 conceptually illustrates scanning of a real world object and injection of a corresponding virtual object into a video game, in accordance with implementations of the disclosure.

FIG. 1 conceptually illustrates scanning of a real world object and injection of a corresponding virtual object into a video game, in accordance with implementations of the disclosure. In the illustrated implementation, a user 100 operates a second screen device 102. In implementations of the disclosure, the device 102 is described as a "second screen" in the sense that it is secondary in relation to the primary screen of a display 114 on which the video game is presented. However, it is recognized that in some implementations, the device 102 can also be the device through which the video game is presented, in which case the device 102 functions as both the primary and secondary screens.

By way of example without limitation, the second screen device 102 can be a portable gaming device (e.g. PlayStation Vita), tablet, cellular phone, or other portable/handheld device having a camera (e.g. rear-facing) for image capture and a display screen (e.g. front-facing or opposite facing versus the camera) for presenting graphics, such as real-time images from the camera. In the illustrated implementation, the user 100 uses the second screen device 102 to capture images of the real world object 104 in the local environment.

In some implementations, the image capture is performed by capturing a 360 degree scan of the real world object 104, wherein the user 100 moves the second screen device around the real world object 104 while continuing to direct the camera of the second screen device 102 towards the real world object 104, thus capturing imagery of the real world object from a plurality of angles or vantage points surrounding the real world object. The image capture can be configured to capture image data in the form of discrete images and/or video, which provide a 360 degree surrounding view of the real world object. In some implementations, images are stitched together to form the 360 degree surrounding view of the real world object. Furthermore, in some implementations, the scan process includes processing the captured image data to generate a 3D representation/model of the real world object, such that 3D structure, surfaces and dimensions are represented.

While implementations described herein entail use of a portable/handheld device for scanning a real world object, in other implementations, a substantially stationary camera can be used for scanning, e.g. by having the user manipulate the real world object in the field of view of the camera to facilitate capture from multiple angles (e.g. rotate the real world object while holding it). In some implementations, a real world object is scanned using an externally facing camera of a head-mounted display (HMD).

In some implementations, the scan process uses a depth camera (e.g. in addition to a regular non-depth camera) for image capture, which is capable of capturing depth information (e.g. distance of a given pixel to the depth camera). It will be appreciated that utilizing a depth camera can enable faster and/or more robust determination of 3D structure in some implementations.

By way of example without limitation, in the illustrated implementation, the real world object 104 is illustrated as being a lamp. However, it will be appreciated that the real world object 104 can be any type of object existing in the real world that may be captured using the second screen device 102. For example, users may capture real world objects from within their room in which they engage in video game gameplay, or real world objects from other locations, including outdoors.

The scanned object image data, which may include captured images and/or video and/or a 360 degree surrounding view of the real world object 104 in some implementations, are processed to generate a 3D model of the virtual object (ref. 106). In some implementations, this entails searching against a library of pre-defined 3D models, whereas in other implementations, the 3D model is generated anew based on the scanned object image data.

Then, the attributes and functionality of the real world object 104 are determined and applied to the 3D model to generate a corresponding virtual object or virtual asset (ref. 108). By way of example without limitation, examples of such attributes include color(s), dimensions (e.g. height, width, depth), weight, reflectiveness, etc. Functionality can include any type of operational characteristic or utility of the real world object 104 for which a virtual analogue can be imputed to the corresponding virtual object. For example, in the case of the real world object 104 being a lamp, then the corresponding virtual lamp may have the functionality of being able to be turned on (to provide illumination), turned off (ceasing illumination), change color, adjust brightness, adjust angle of lampshade, adjust angle of a moveable arm, etc.

After the virtual object is generated, then it can be inserted into the video game or simulation (ref. 110). For example, in the illustrated implementation, a video game is presented on the primary display 114 (e.g. television, monitor, LCD/LED display, etc.). In some implementations, the video game is locally executed by a computer 112 (e.g. game console, personal computer, laptop, etc.), whereas in other implementations the video game can be cloud executed, with gameplay video and input streamed between the computer 112 and a server of a cloud gaming system. In some implementations, the computer 112 and the display 114 are separate devices which are connected, whereas in other implementations, the computer 112 and the display 114 are integrated in the same device. In some implementations, a player of the video game such as user 100 operates a controller 116 to interface with and provide input to the video game, e.g. to control a representative avatar or virtual character in the virtual environment.

In the illustrated implementation, the corresponding virtual object 118 is inserted into a virtual environment of the video game, and thereby visible when a view of the virtual environment including the virtual object 118 presented in the display 114. It will be appreciated that as the virtual object 118 is now part of the virtual environment it can be subject to the same interactive aspects as other objects in the virtual environment, including with respect to lighting, reflections, collision detection, etc. Furthermore, the virtual object 118 can include functionality that operates in the context of the virtual environment, such as being capable of being turned on or off in the case of the virtual object 118 being a lamp as illustrated.

Figure 2:
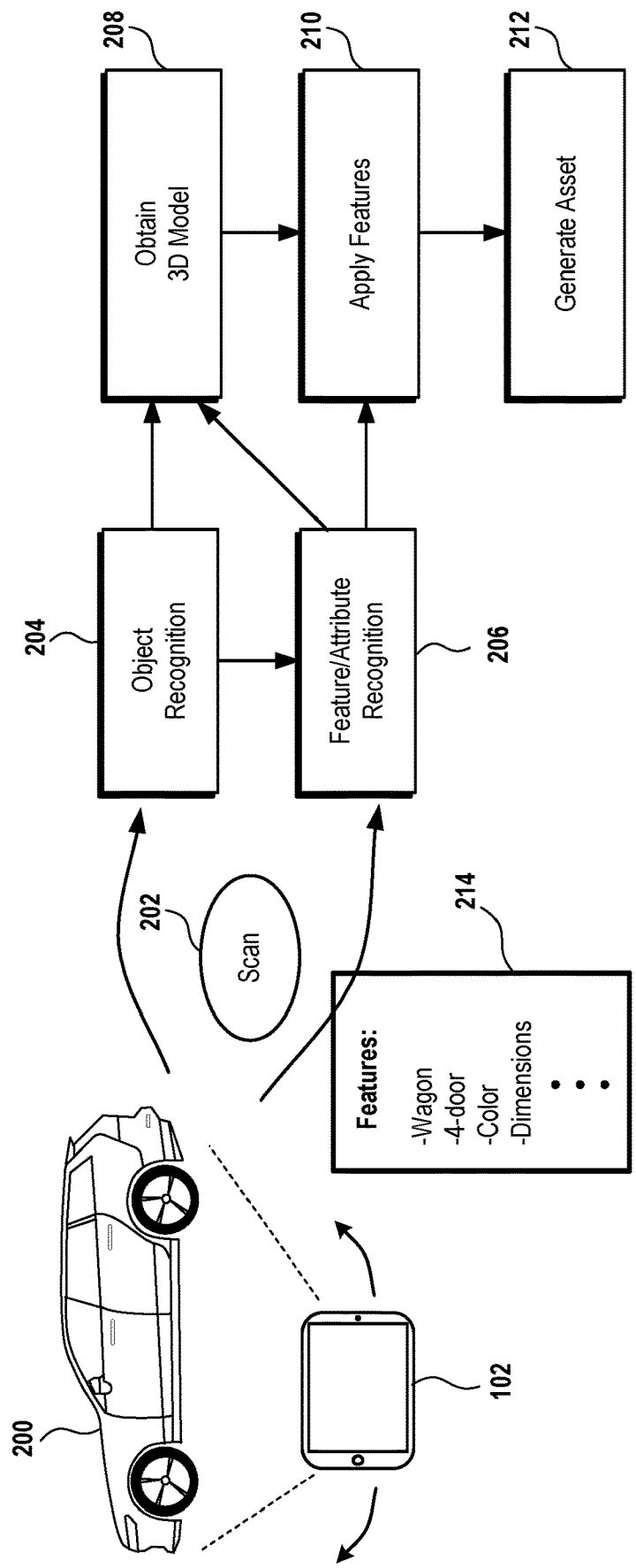
FIG. 2 conceptually illustrates a process for recognizing and applying features of a virtual object generated based on scanning of a real world object, in accordance with implementations of the disclosure.

FIG. 2 conceptually illustrates a process for recognizing and applying features of a virtual object generated based on scanning of a real world object, in accordance with implementations of the disclosure. In the illustrated implementation, the second screen device 102 is utilized to perform a 360 degree scan of the real world object 200, which in the illustrated implementation, is in the form of a car/vehicle. The scanning process 202 generates object image data, which is analyzed by an object recognition process 204. The object recognition process 204 is configured to identify, based on the captured object image data, the type of the real world object 200, such as determining what the real world object 200 is, or what it is named or called in the user's language (e.g. English). By way of example without limitation, in the illustrated implementation, the object recognition process 204 applied to the scanned image data may recognize that the real world object 200 is a car.

In some implementations, the object recognition process 204 employs a machine learning model to recognize and identify the real world object 200. In some implementations, the machine learning model classifies, categorizes or labels the real world object 200 according to its trained understanding of real world objects. In some implementations, the scanning process generates a 3D representation/model of the real world object, and the machine learning model is trained to identify such a 3D representation. In some implementations, the scanning process generates 2D image data as previously described, and the machine learning model is trained to identify the real world object based on the 2D image data.

In some implementations, the object recognition process 204 references the scan of the real world object against a database of reference objects, and determines a closest match from among the reference objects, in order to recognize and identify the real world object. In some implementations, a similarity measurement is determined to quantify the degree of similarity with the closest matching object, and thereby determine the level of confidence in the identification.

Furthermore, in addition to the object recognition process 204, a feature/attribute recognition process 206 is performed to recognize or identify features and/or attributes of the real world object 200. For example, in the illustrated implementation, the feature recognition process may further recognize that the real world object 200 is not only a car, but more specifically, a wagon body style, with four doors, having a certain color, and having certain dimensions, etc. It will be appreciated that features of a car are described by way of example without limitation, with reference to the illustrated implementation. It will be appreciated that in various implementations, features/attributes of a given object can include descriptive information about various kinds of options, configurations, dimensions, parts, numbers of parts, arrangements of parts, appearances of parts (e.g. color(s), designs, artistic aspects), materials, functions, or any other aspect of a given object that further defines its structure, appearance, or functional capabilities of the object.

In some implementations, features and attributes are identified, at least in part, based on first using the object recognition process 204 to identify the type of object. That is, the type of object that the real world object is determined to be may also determine which features/attributes will be defined for the virtual object representation of the real world object. For example, in the illustrated implementation, the real world object 200 is a car, and once identified as such, the system may have various features which are associated with a car, and which are to be determined from the scanned information, such as the number of doors, body style, color, dimensions, etc.

With continued reference to FIG. 2, at operation 208, a 3D model of the real world object 200 is obtained. In some implementations, the 3D model is obtained from a library of predefined 3D models. For example, based on the identification of the object type/name, and possibly one or more identified features of the object, then a corresponding predefined 3D model is retrieved from the library. Then at operation 210, any relevant features identified from the scan of the real world object are applied to the 3D model, such as defining any configurable aspects or dimensions of the 3D model, defining the colors/appearance of surfaces, etc. At operation 212, after the features are applied to the 3D model, then a virtual object corresponding to the real world object 200 is generated and stored as an asset for deployment in a virtual environment, such as a virtual environment of a simulation or video game.

Figure 3:
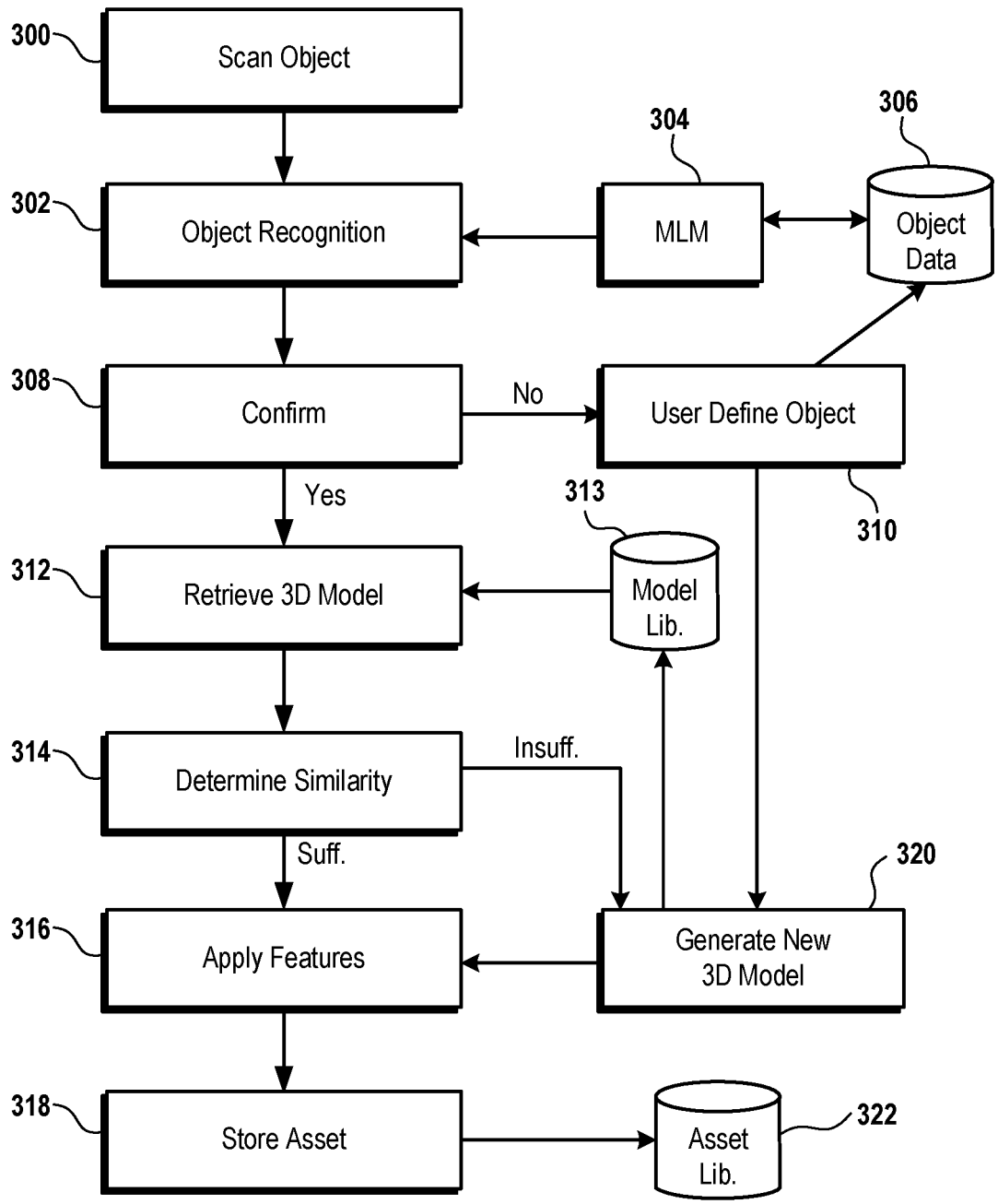
FIG. 3 conceptually illustrates a method for generating an asset for deployment in a virtual environment based on scanning a real world object, in accordance with implementations of the disclosure.

FIG. 3 conceptually illustrates a method for generating an asset for deployment in a virtual environment based on scanning a real world object, in accordance with implementations of the disclosure. At method operation 300, a real world object is scanned, e.g. using a second screen device as previously described. As noted above, the scan can entail capturing a 360 degree surrounding view of the real world object, and may further entail 3D scanning process that generates a 3D model of the real world object.

At method operation 302, an object recognition process is performed to identify the real world object, such as identifying its type or name or other descriptor of the real world object. In some implementations, a trained machine learning model 304 is employed to recognize the real world object. The machine learning model 304 can be trained using labeled/classified object data 306, to enable the machine learning model 304 to identify the real world object based on the data generated from the scanning process.

At method operation 308, a confirmation process is performed to confirm whether the object recognition was successful. For example, the user performing the scan can be asked whether the identified type or name of the real world object is correct (e.g. by presenting the question on the second screen device), to which the user can respond by answering yes or no (e.g. by selecting yes or no options presented on the second screen device). If the user responds no, indicating that the identification is incorrect, then in some implementations, at method operation 310, the user may define the identification of the real world object, such as by entering the type or name of the real world object. The new object identification and its corresponding scan data are added to the object data 306, which will be used to train the machine learning model 304, so that over time, the machine learning model 304 will recognize the newly added object.

If at method operation 308, the user confirms the identification of the real world object by the object recognition process, then the method proceeds to method operation 312, wherein a corresponding predefined 3D model for the identified type/name of the real world object is retrieved from a model library 313.

At method operation 314, the similarity of the retrieved 3D model to the actual real world object is determined. In some implementations, this determination is made based on user input, such as by asking the user whether the selected 3D model matches the real world object to an acceptable extent.

In some implementations, the similarity of the retrieved 3D model to the real world object is determined by comparing the retrieved 3D model to a representation generated from the scan of the real world object, such as a generated 3D model from the scan data. In some implementations, if the degree of similarity exceeds a predefined threshold, then the retrieved 3D model is determined to be sufficiently similar to the real world object, and the method proceeds to method operation 316.

If the retrieved 3D model is not sufficiently similar to the real world object, then a new 3D model is generated at method operation 320. Also, in the case of the user defining the real world object as a new object for the system at method operation 310, then the method also proceeds to generate the new 3D model at method operation 320. In some implementations, the new 3D model can be a 3D model that is generated as a result of the scanning of the real world object, and may be further refined or adjusted to generate the new 3D model. The new 3D model can be generated using any of various graphical rendering technologies, such as by defining a point cloud, a polygon mesh, defining surface textures, displacement mapping, specular mapping, fresnel, etc. The new 3D model that is generated is added to the model library 313 for future use.

At method operation 316, the features and/or attributes of the real world object are applied to the 3D model (predefined/retrieved or newly generated). This can include skinning the model, to determine its appearance in the virtual environment, such as applying captured aspects of the real world object such as shape, geometry, textures, etc. At method operation 318, the resulting asset is stored to an asset library 322 for future retrieval and deployment in a virtual environment.

Figure 4:
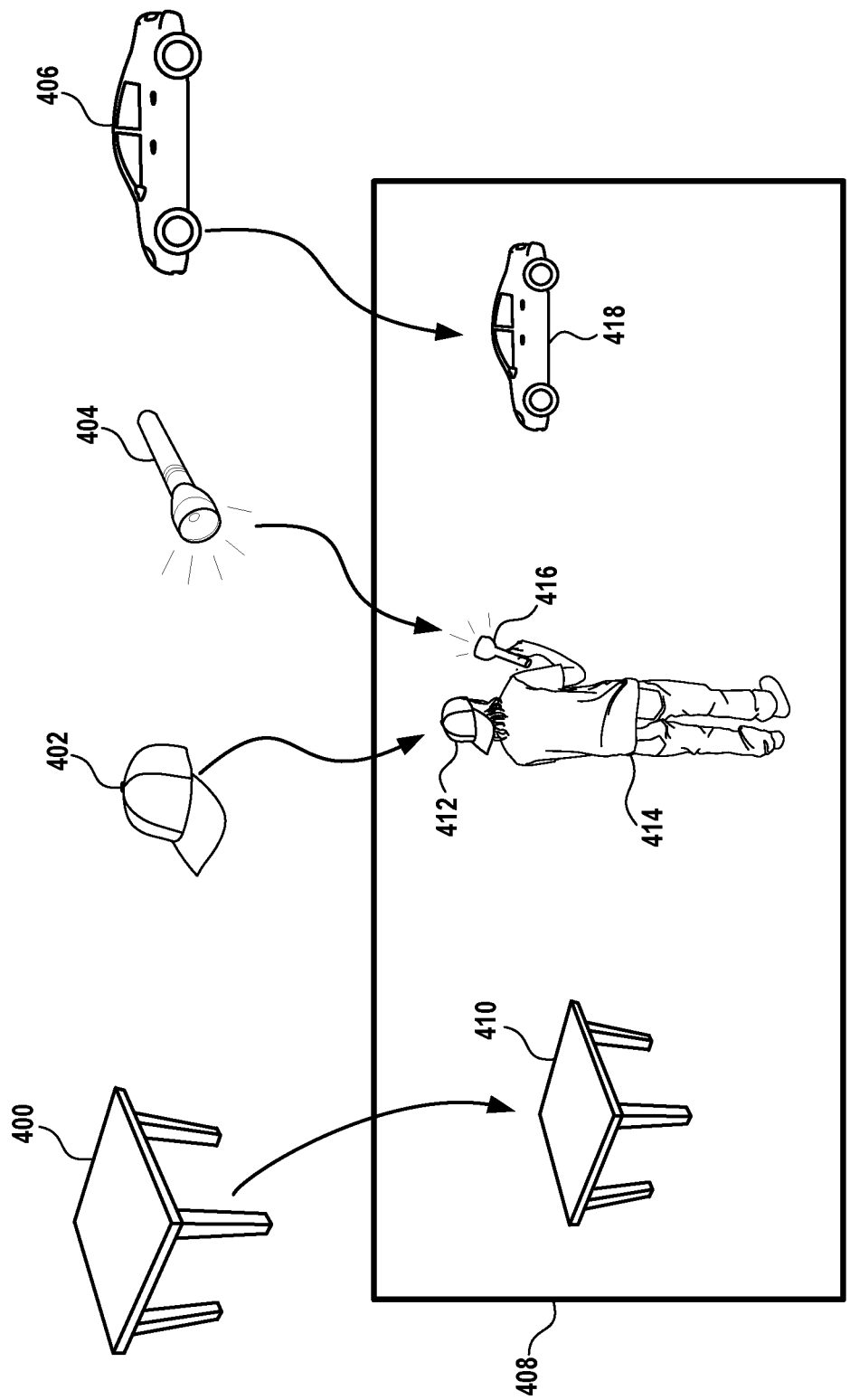
FIG. 4 conceptually illustrates insertion of various types of objects into a virtual environment, in accordance with implementations of the disclosure.

FIG. 4 conceptually illustrates insertion of various types of objects into a virtual environment, in accordance with implementations of the disclosure. In the illustrated implementation, various real world objects are shown, such as a table 400, hat 402, flashlight 404, and car 406. As described in the present disclosure, such real world objects can be scanned and inserted into a virtual environment, such as in a scene of a video game or virtual world or other simulation. That is, a virtual object or asset is generated that resembles the real world object based on its scan, and the virtual object is inserted into the virtual environment. As described, the process of generating the virtual object can include generating or obtaining a 3D model of the real world object and applying attributes to the 3D model. It will be appreciated that there can be many different types of objects that are modeled and inserted in the virtual environment.

For example, there can be fixed, non-movable objects inserted into the virtual environment. That is, once such an object is placed into the virtual environment, then the object is no longer moveable in the ordinary course of gameplay or regular interactivity in the virtual environment. Examples of such fixed, non-movable objects can include furniture, building structures, interior furnishings, walls, natural environmental features, etc. In the context of a video game, these can further include generally larger objects which can be used for covering oneself or obstructing the path of other players or preventing them from moving somewhere. It will be appreciated that objects are arbitrarily defined to be fixed and non-movable in the virtual environment, for example, to be consistent with the game design or to present a consistent virtual environment for all players with respect to such objects. By way of example without limitation, in the illustrated implementation, the real world table 400 is inserted into the virtual environment 408 as virtual table 410, with the virtual table 410 being configured to be fixed at its location and non-movable.

In addition to being non-movable, such fixed objects may also be non-destructible and/or non-deformable. Thus, such objects may be configured to be placed as permanent objects in the virtual environment.

Another object type includes movable fixed objects, wherein the object itself is fixed, but movable by the player or carried on the player's avatar as it is moved in the virtual environment. Examples include any articles of clothing or other items which are worn or carried by the player's avatar (e.g. helmet, shield, armor, etc.), or other articles which are movable by the player in the virtual environment (e.g. can be picked up or manipulated), such as a ball, cup, plate, etc. Thus, such objects can be configured to be movable in the scene on the player.

In some implementations, objects which are worn on the player's avatar are automatically sized appropriately for the player's avatar. For example, a jacket that is scanned and inserted as a virtual jacket worn by the player's avatar may be adjusted so that the body of the virtual jacket fits the avatar's torso and the sleeve length fits the avatar's arm length, etc. In the illustrated implementation, the real world hat 402 is inserted into the virtual environment 408 as virtual hat 412, and further worn by an avatar 414. Accordingly, the virtual hat 412 is sized to appropriately fit the head of the avatar 414.

Extending the concept, it will be appreciated that during the deployment of any given virtual object into a virtual world, the virtual object may need to be resized to be appropriate for the context in which it is placed or used. As noted, articles worn or used by a virtual character can be automatically adjusted to fit the virtual character wearing or using them. For example, in addition to clothing (e.g. garments, shoes, glasses/goggles, etc.) being automatically resized, other types of objects associated with a virtual character, such as weapons, tools, utensils, devices, etc. can be automatically resized to suit the virtual character. Similarly, any virtual object that is linked to or associated with (e.g. attached to, used by, etc.) another object in the virtual environment can be resized based on the other object so as to be appropriate for the other object. In some implementations, a deployed virtual object is resized based on a size comparison with other similar or related objects (e.g. sizing a car based on the sizes of other cars in the scene).

However, in some implementations, a user may wish to add an object (e.g. a wall or an obstacle, etc.) for which the dimensions/sizes are defined by the user. It will be appreciated that such user-defined sizing can be independent of other objects in the virtual environment. In some implementations, an automatically determined sizing/dimensions can be provided as a suggestion for the user (e.g. based on other objects such as that discussed above), and the user may accept or reject such a suggestion, adjust the suggested sizing/dimensions, or enter new dimensions/sizing.

Another category is that of usable objects, which includes objects having functions attached thereto, which perform some action in the virtual environment. Examples include weapons (e.g. gun, cannon, bow, etc.), vehicles (e.g. car, truck, motorcycle, scooter, bicycle, airplane, helicopter, etc.), tools, etc. The functions associated with such objects can be performed and visualized in the virtual environment, and accordingly, the corresponding virtual objects are configured to have the requisite functionality defined for use in the virtual environment, including animation of the virtual object showing its functionality when performed. Examples of a virtual object inserted with a functionality in a virtual environment include, a virtual weapon imported into the virtual environment that can be fired by the player, an inserted virtual vehicle that can be driven/piloted by the player, etc.

In some implementations as discussed, the functionality for an inserted virtual object is predefined/obtained based on recognition of the real world object as being of a given type that therefore includes the predefined functionality. In some implementations, a user interface is provided to enable a user to adjust or define the functionality of a given virtual object, including optionally including or excluding a predefined functionality for the given virtual object, or adjusting a setting for a predefined functionality. In some implementations, the user can assign a given functionality to the virtual object, or define a new functionality for the virtual object.

It will be appreciated that the functionality for given virtual object, whether obtained from a predefined source or newly defined, further defines how such functionality is accessed or operated by a user, such as defining the interface mechanism that triggers a given function. For example, in the context of a video game, an object's functions may be mapped to controller buttons or other input devices which can be used to trigger the function to be activated, turned on/off, fired, etc. In some implementations, when the virtual object is displayed on the second screen device (such as in a view of the virtual environment in which the virtual object is deployed), the associated functionality of the virtual object can be activated or triggered by, for example, tapping on the virtual object itself as it is displayed on a touchscreen of the second screen device.

By way of example without limitation, in the illustrated implementation, the real world flashlight 404 is scanned and inserted into the virtual environment 408 as virtual flashlight 416. Because the real world flashlight 404 is recognized as being a flashlight, the system generates the virtual flashlight 416 as including the functionality of a flashlight, namely being capable of being turned on or off, providing illumination and acting as a light source in the virtual environment, and being movable by the user, for example, by being held and maneuvered by the avatar 414. As another example shown in the illustrated implementation, the real world car 406 is scanned and inserted into the virtual environment 408 as virtual car 418. Because the real world car 406 is recognized as being a car, the system generates the virtual car 418 as including the functionality of a car, namely being capable of being driven in the virtual environment by the user, such as by enabling the avatar 414 to open the door of the virtual car 418 and climb in to the driver's seat, and assume control of movement of the virtual car 418 in the virtual environment 408.

Some further non-limiting examples of functionality assigned to a virtual object include the following: a virtual weapon having the functionality for firing or using the virtual weapon (including e.g. types of projectiles fired by the weapon, amounts of damage caused by the virtual weapon, etc.), a virtual writing/drawing implement (e.g. a pen, pencil, brush, etc.) having the functionality for creating marks on surfaces in the virtual environment, a virtual keyboard having the functionality of keys being animated to show them being depressed, etc.

Additionally, in some implementations, the functionality assigned to a virtual object includes the sounds that are associated with the real world object, or associated with activation of a given function of the real world object. For example, a virtual gun may produce the sound of a gunshot when fired, a virtual car may produce the sound of an engine revving when driven, a virtual lamp may produce the sound of a switch when turned on or off, etc.

In some implementations, functionality assigned for use in the virtual environment need not be present in the corresponding real world object. For example, the real world object may be a toy version of an object, e.g. a toy version of a car, while the corresponding virtual object is assigned the functionality that is associated with the actual real version of the object, e.g. the corresponding virtual car is drivable in the virtual environment and scaled appropriately as a "real" car in the virtual environment. A toy stuffed animal could be inserted as a virtual animal that can move or otherwise behave like the real animal would behave (e.g. produce sounds that the real animal would produce), but in the virtual environment. Similarly, a toy humanoid figure could be inserted as a virtual character and assigned behaviors in the virtual environment.

In some implementations, the conversion from real world object to virtual object is configured to match an artistic style of the virtual environment. For example, human characters in a given video game may not be drawn realistically but rather drawn in a certain artistic style. Accordingly, if a real world person is scanned, then the corresponding virtual character is generated to be in the style of the video game, but with skinning or features/attributes that are configured to resemble that of the real world person. For example, the real world person may have dark hair, and so the virtual character is configured with dark hair, but the virtual character is in the artistic style of the video game.

Figure 5:
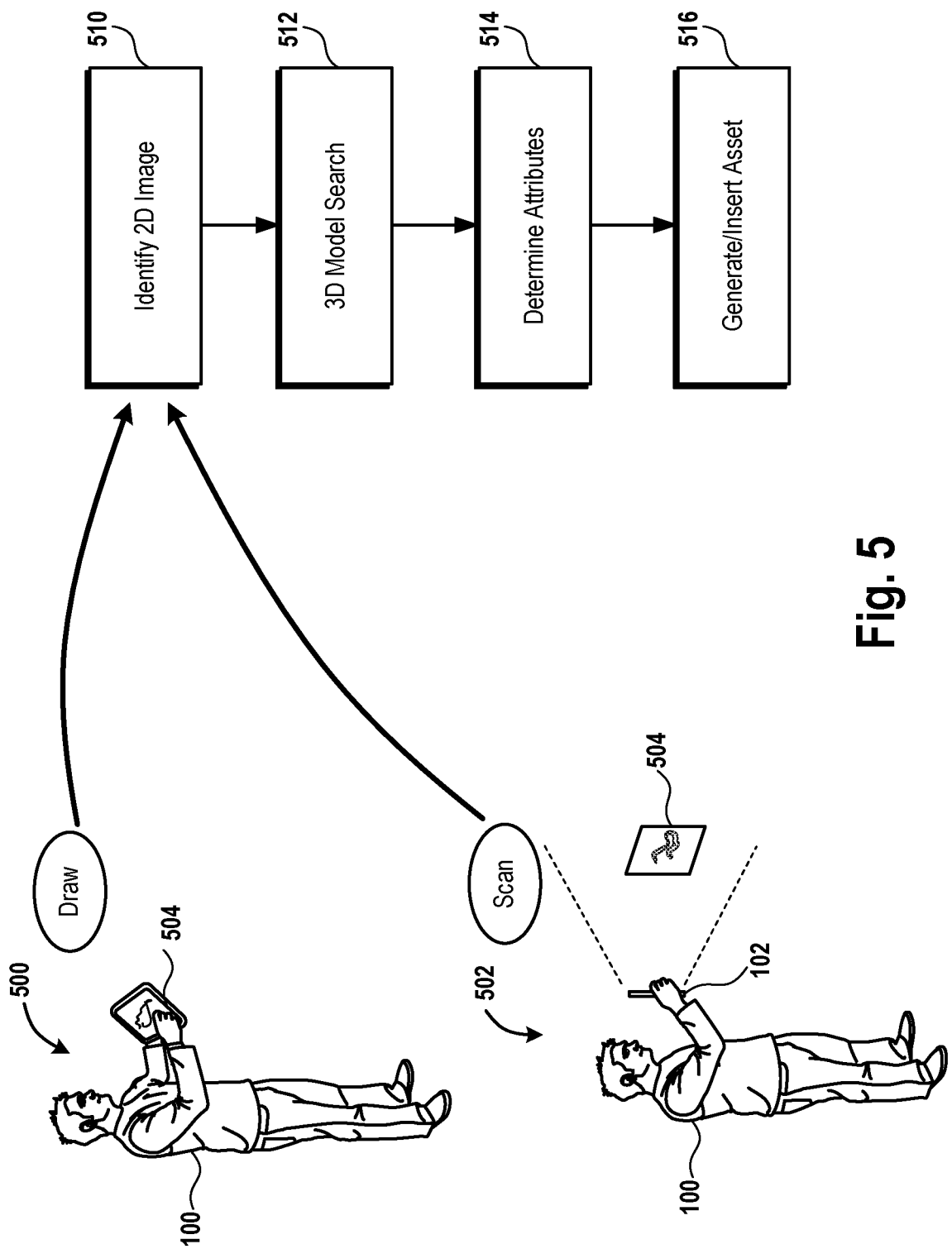
FIG. 5 conceptually illustrates use of a two-dimensional (2D) image to enable insertion of a virtual object into a virtual environment, in accordance with implementations of the disclosure.

FIG. 5 conceptually illustrates use of a two-dimensional (2D) image to enable insertion of a virtual object into a virtual environment, in accordance with implementations of the disclosure. While scanning of three-dimensional objects has been described in order to insert corresponding virtual objects into a virtual environment, in other implementations of the disclosure, two-dimensional drawings or images can be utilized to insert virtual objects. For example, as conceptually shown at reference 500, the user 100 draws a picture of an item, for example, on a touch screen display of the second screen device 102. Or in another implementation as conceptually illustrated at reference 502, the user 100 creates a drawing 504, e.g. on a piece of paper, and captures a two-dimensional scan of the drawing 504 using the second screen device 102. In either scenario, a two-dimensional image is generated that includes a drawing of an item.

At method operation 510, an image recognition process is applied to identify the item drawn in the two-dimensional image. Similar to that described above, the recognition process is configured to recognize or identify the type or name or other descriptor of the item which is shown in the image. Then at method operation 512, a 3D model search is performed to identify a corresponding 3D model for the identified object of the drawing. It will be appreciated that that the recognition process and/or the 3D model search can utilize a machine learning model. At method operation 514, attributes of the object are determined, for example by determining or extracting such attributes from analysis of the drawing of the item, and such attributes are applied to the 3D model. Then at method operation 516, the resulting virtual object/asset is generated and inserted into a virtual environment.

Accordingly, a user can draw something in 2D, and the 2D image can processed, labeled, and matching 3D model can be obtained to enable generation of a corresponding virtual object to the item drawn by the user. This can be especially useful to a player that doesn't have a particular object, but wishes to insert such an object into the virtual environment, as they are able to obtain a corresponding virtual object without possessing the real world object.

FIG. 6 conceptually illustrates a user interface process for inserting a virtual object into a virtual environment, in accordance with implementations of the disclosure. In the illustrated implementation, the user is engaged in a video game or simulation that is rendered by a computer 112 to a display 114. The user operates a second screen device 102 to scan the real world object 600 (e.g. a bicycle in the illustrated implementation). The scan is analyzed and identified (e.g. identified as a bicycle) and a corresponding virtual object is generated, as previously described.

After processing of the scan, the user interface presented on the second screen device 102 may show a view 602, wherein the results of the scan processing are presented, informing the user 100 of what the real world object 600 has been identified as, and suggesting a corresponding virtual object for insertion into the virtual environment of the video game. The suggested virtual object is visually displayed for the user to evaluate. When the user accepts the virtual object for insertion, then the second screen device shows the view 604, wherein an interface that allows the user to rewind the gameplay of the video game to an earlier timepoint is presented. By way of example without limitation, the interface shown can include a moveable slider 606, which the user can control (e.g. by dragging the slider using touch gestures on the second screen device 102) in order to access an earlier timepoint in the gameplay.

Accordingly, after rewinding the gameplay, then the interface presents a view 608, which is from an earlier timepoint in the gameplay. At this earlier timepoint in the gameplay, which is at a different location in the virtual environment, the user places the virtual object 610 that was generated from the real world object 600. In some implementations, the user 100 can move the virtual object 610 such as by using touch gestures on the second screen device to drag the virtual object from one location to another. In some implementations, the virtual object 610 can be rotated in the virtual environment, such as by using touch gestures on the second screen device. In some implementations, the virtual object can be resized/scaled, such as by using pinch and expand touch gestures on the second screen device 102.

In some implementations, the interface on the second screen device 102 presents a 3D view of the virtual environment in which the user can navigate to a desired location for placement of the virtual object. In some implementations, the interface presents a 2D view, such as a map view or overhead view of the virtual environment in which the user can place the virtual object.

In some implementations, the virtual object is placed into the running game, such as by rewinding the game as described above. In other implementations, a single frame of the game showing a portion of the virtual environment can be presented, and the user enabled to place the virtual object within the single frame, whereupon the system identifies the specific location in the virtual environment at which the virtual object has been placed.

In some implementations, the user interface for placement is presented on the display 114. The control of the user interface can be through the second screen device 102, such as by enabling touchscreen controls through the second screen device 102 that affect the placement of the virtual object shown on the display 114.

Figure 7A:
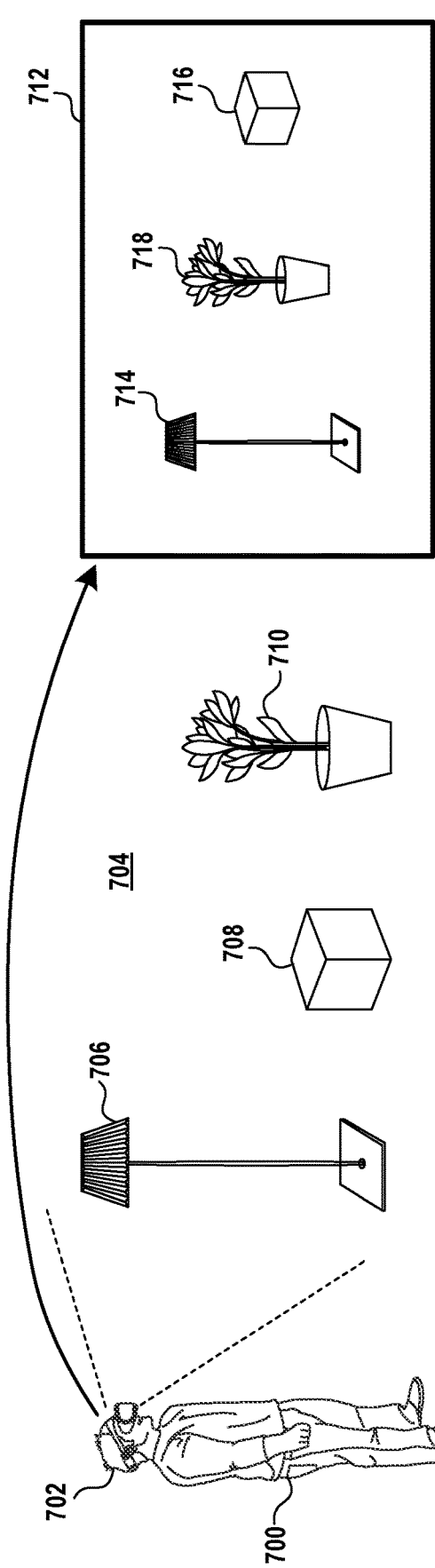
FIGS. 7A and 7B conceptually illustrate tracking of the states of real world objects that have been inserted into a virtual environment, in accordance with implementations of the disclosure.
Figure 7B:
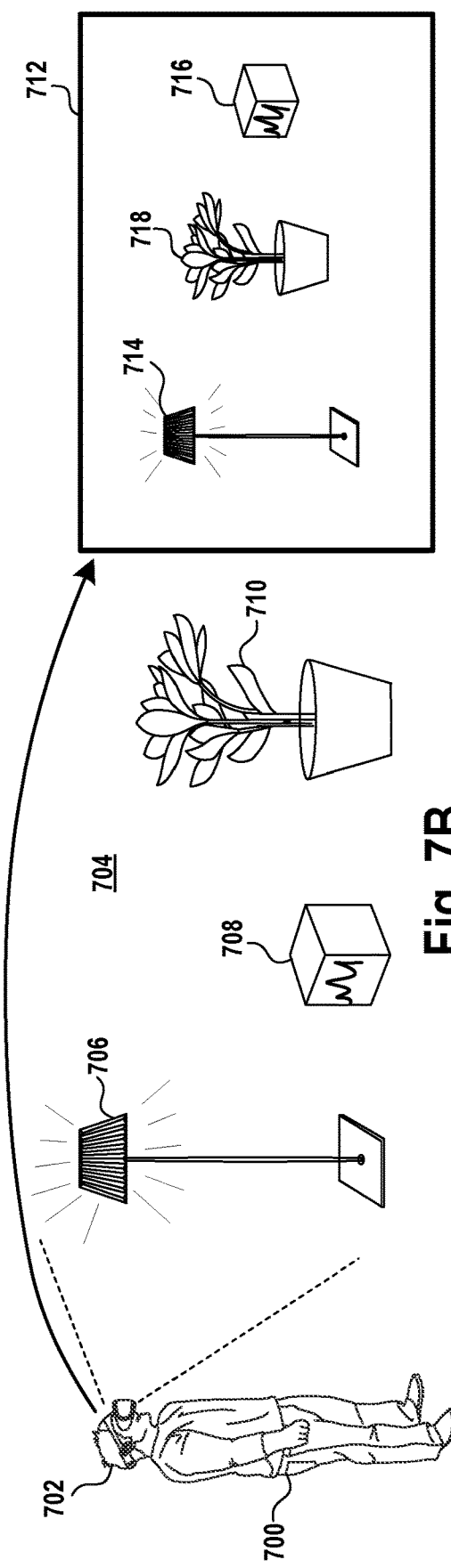

FIGS. 7A and 7B conceptually illustrate tracking of the states of real world objects that have been inserted into a virtual environment, in accordance with implementations of the disclosure. In some implementations, a real world object that has been scanned and inserted into a virtual environment can continue to be tracked in the real world, so that changes in the real world object can be identified and reflected in updates to the corresponding virtual object in the virtual environment. FIG. 7A illustrates by way of example without limitation, a user 700 wearing a head-mounted display (HMD) 702. The HMD 702 includes one or more externally facing cameras which are used to capture real world objects in the real world local environment 704 such as a lamp 706, a box 708, and a plant 710. Scans of the lamp 706, the box 708, and the plant 710 can be performed by having the user 700 direct the HMD's cameras towards these real world objects, and in some implementations, walk around the objects to enable image capture from multiple angles surrounding the objects. As has been described, corresponding virtual objects can be generated and deployed into a virtual environment 712. In the illustrated implementation, the virtual environment 712, which is viewable through the HMD 702 (e.g. for purposes of a video game or other simulation or VR program), is shown to include a virtual lamp 714, a virtual box 716, and a virtual plant 718 that correspond to the lamp 706, the box 708, and the plant 710, respectively.

In some implementations, the externally facing cameras of the HMD 702 are also used for location/orientation tracking of the HMD 702, e.g. using a SLAM (simultaneous location and mapping) technique, possibly in combination with other sensors in the HMD 702, such as accelerometers, gyroscopes, magnetometers, or other motion sensing hardware. Thus, in the ordinary course of use of the HMD 702, its positional tracking in the local environment may include recurring capture of the real world objects in the local environment 704. Accordingly, in some implementations, the real world objects can continue to be recognized, and their states can be tracked and used to update the state of their corresponding virtual objects in the virtual environment 712.

For example, FIG. 7B illustrates the local environment 704 at a later time than that illustrated at FIG. 7A. At this later time, the lamp 706 is turned on, the box 708 includes a drawing on its side, and the plant 710 has grown. These real world objects continue to be associated to the corresponding virtual objects in the virtual environment 712, and accordingly, the virtual lamp 714 is turned on in the virtual environment, the virtual box 716 is updated to include the drawing on its side, and the virtual plant 718 is updated to show that it has grown by a similar amount to the real world plant 710.

Thus, in some implementations, when an object from the real world is incorporated into a virtual environment, it is not just scanned once, but it can continue to be scanned or captured at later time points, and its long term state can be tracked over time. In this manner, the simulation keeps connection back to the real world objects and tracks the state change of these objects.

While the foregoing has been described with reference to an HMD, it will be appreciated that in other implementations, a second screen device as previously described, or another camera that captures the local environment can also be utilized for long term tracking of the state of real world object. In some implementations, the system is configured to prompt the user after a predefined amount of time (or at periodic intervals of time) to update the scan of the real world object in order to capture any changes in the state of the real world object. For example, the system may inquire of the user whether they would like to update a virtual object, or if there have been any changes to its corresponding real world object, and if so, then directing the user so as to perform re-scanning of the virtual object's corresponding real world object. Differences between the virtual object and the re-scanned real world object can be identified and used to update the virtual object in the virtual environment.

Figure 8:
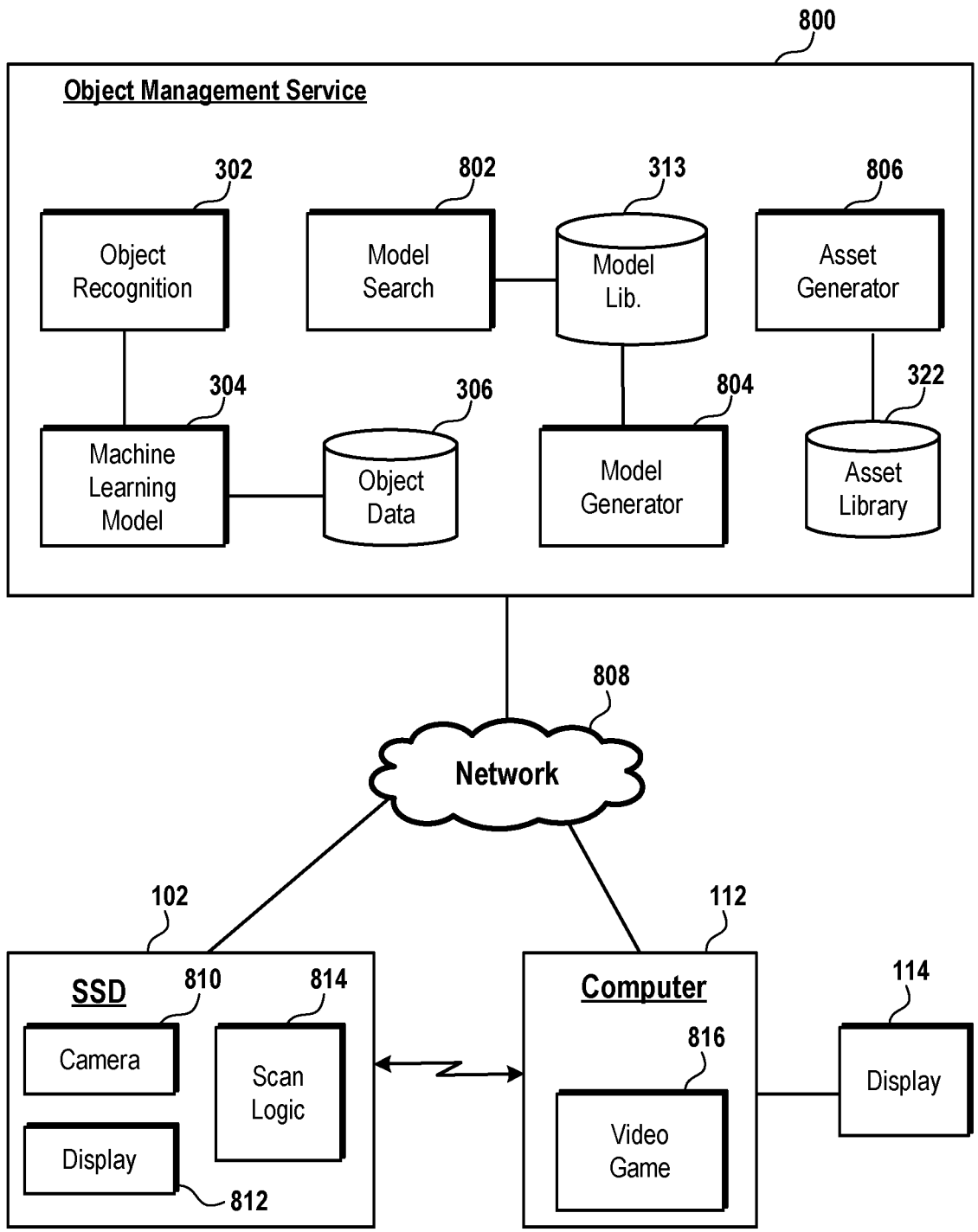
FIG. 8 conceptually illustrates a system for insertion of real world objects into a virtual environment, in accordance with implementations of the disclosure.

FIG. 8 conceptually illustrates a system for insertion of real world objects into a virtual environment, in accordance with implementations of the disclosure. As shown, the second screen device 102 includes a camera 810 and a display (e.g. touchscreen display) 812. The second screen device 102 implements scan logic 814 that is configured to control the camera 810 to scan a real world object, such as by enabling a 360 degree surrounding image capture of the real world object. In some implementations, the scan logic 814 processes the captured image data, e.g. stitching images together, or generating a 3D scan of the real world object by processing captured image data. The scan logic 814 outputs scan data that is a scan of the real world object.

In some implementations, the second screen device 102 communicates over a network 808, e.g. including the Internet, to an object management service 800 that is implemented on one or more server computers. The second screen device 102 also communicates locally, e.g. wirelessly, or through network 808 with the computer 102. In the illustrated implementation, the computer 112 executes a video game 816, and further renders gameplay video of the video game for presentation on a display 114.

In some implementations, the second screen device 102 transmits the scan data over the network 808 to the object management service 800. In some implementations, the scan data is transmitted via the computer 112.

The object management service 800 includes an object recognition process 308 that identifies the real world object that is captured in the scan data. In some implementations, a machine learning model 304 (trained using object data 306) is employed to recognize the real world object from the scan data.

In some implementations, based on the identification of the real world object in the scan data, a model search 802 is implemented that searches a model library 313 for a matching predefined 3D model for the identified object. In some implementations, instead of retrieving a predefined model, a model generator 804 generates a new 3D model, corresponding to the real world object, that is added to the model library 313. An asset generator 806 applies features and attributes of the real world object to the 3D model, to generate a corresponding virtual object or asset that is stored to an asset library 332. The asset generator 806 also assigns functions to the virtual object which operate in the context of the virtual environment in which the virtual object is deployed.

The generated virtual object is deployed into the virtual environment of the video game 816 and thus becomes part of the video game gameplay.

While in the illustrated implementation, the object management service 800 is accessible over a network 808, in other implementations, any portion of the object management service may be implemented on the computer 112 or on the second screen device 102. For example, in some implementations, the model generator 804 is implemented on the computer 112 to generate a new 3D model that is uploaded to the model library 313. In some implementations, the asset library 322 is implemented locally at the computer 112, or portions thereof are replicated and stored at the computer 112, to be easily accessible by the video game 816.

It will be appreciated that by enabling players of a video game to scan and insert real world objects into the video game, new kinds of gameplay mechanics become possible. For example, first player may be engaged in gameplay of the video game, while a second player scans objects, and inserts them into the video game virtual environment. In some implementations, the first and second players can play collaboratively, so that the insertion of virtual objects by the second player is intended to help the gameplay of the first player or otherwise support the achievement of gameplay objectives by both the first and second players. For example, the second player may insert objects that are intended to block enemies from moving in a particular direction in the virtual environment, or shield the first player from the enemies, etc.

In other implementations, the second player is adversarial to the first player, so that the insertion of virtual objects into the video game virtual environment is intended to obstruct or otherwise prevent the first player from achieving their gameplay objectives in the video game. For example, an inserted virtual object by the second player may be intended to obstruct the path of the first player.

In some implementations, multiple users can contribute virtual objects to the same shared virtual environment, so that real world objects from different users (in different locations) are collectively represented in the same virtual space. This enables greater customization by users, and furthermore users can be more accurately represented in a shared virtual environment by enabling the users to insert objects from their respective local environments, including objects worn or handled by the respective users. For example, a user could scan their favorite pair of sunglasses, and their avatar would wear the sunglasses in the virtual environment. Users could engage in a virtual potluck, for example, with each user inserting a dish into the virtual environment. Users could virtually show, share, or demonstrate objects from their real world local environments with each other. Because such objects would be represented in 3D in the virtual environment, and could be manipulated by users, this could create a powerful immersive effect for users, especially in virtual reality.

Implementations of the present disclosure can be included as part of a game engine. Broadly speaking, a game engine is a software-development framework providing features that enable efficient development of video games. A game engine can include a software library with reusable modules to handle various aspects of game functionality, including by way of example without limitation, graphics rendering (e.g. including vertex processing, polygon processing, shading, lighting, texturing, etc.), sound, physics (including collision handling), animation, scripting, artificial intelligence, networking, streaming, memory management, threading, localization support, scene graph, cinematics, etc.

Game engines can be optimized for different hardware platforms, such as game consoles, mobile devices, personal computers, etc. By way of example without limitation, a game engine may optimize memory use depending upon the platform (e.g. how to prioritize various tasks in the graphics pipeline, etc.). In some implementations, the hardware may be a bladed version of some specific processing entity, such as a game console. Thus, a user may be assigned to a specific blade, which gives the same hardware that a console game has been optimized for.

It will be appreciated that there can also be game server logic to provide streaming and/or other services (packetizing, encoding, quality of service (QOS) monitoring, bandwidth testing, access to social network/friends, etc.)

In some implementations, a cloud infrastructure may run a hypervisor, which abstracts the hardware and provides a virtual machine framework, upon which an operating system (OS) can be loaded. Thus, a stack may include the application/video game, running on an OS, which is loaded on a virtual machine (VM) instantiated by the hypervisor, which is loaded on underlying hardware. In this manner, the execution of the application is not necessarily coupled to specific hardware.

In some implementations, an application/video game may execute over a container, which abstracts at the application layer, packaging code and dependencies together, thus enabling software development agnostic of OS or hardware platform, and facilitating software portability across platforms.

In some implementations, a distributed game engine is employed wherein different parts of the game engine can be can be handled by different compute entities. For example, the functionality of the game engine such as physics engine, rendering engine (2D/3D graphics), sound, scripting, animation, AI, networking, streaming (encoding), memory management, threading, etc. can be divided into different functional processing blocks and/or services that are distributed among many different computes. It will be appreciated that for a distributed game engine, low-latency communication is required to avoid latency issues. To maintain desired frame rates, total time of computes and communication should meet certain constraints. Thus, it may or may not be efficient to divide certain tasks depending upon whether it is possible to complete the process in shorter time.

An advantage of using a distributed game engine is that it is possible to take advantage of elastic computing, wherein computing resources can be scaled up or down depending upon needs. For example, in a large multiplayer game executed traditionally on a single hardware server, after for example about 100 players, hardware resources become limited, so that more players cannot be added. The game may queue additional players, meaning that players must wait to join the game. However, with a distributed game engine, by using elastic cloud computing resources, more compute nodes can be added to meet demand, thus enabling for example thousands of players. The game is no longer constrained by the limits of a particular hardware server.

Thus, a cloud game engine can have functionality distributed to different processing entities. It will be appreciated that different functions can be executed in different frameworks. For example, some functions (e.g. social) might be easier to run in a container, whereas graphics might be better run using a VM connected to a GPU.

To facilitate distribution of the functionality of a cloud game engine, a distribution/synchronization layer can manage distribution of jobs, e.g. sending jobs out, receiving data back, identifying what tasks are performed and when, handling queueing e.g. if a job is finished faster than needed. In some implementations a given task could be dynamically subdivided if needed. For example, animation could have lighting, and if the lighting is especially complex, the lighting could be subdivided into three lighting jobs that are sent out for computing and reassembled upon return. Thus game engine functions can be subdivided if they require more work.

Cloud service providers provide computes at specified performance levels, for example in input/output operations per second ("IOPS"). Thus, a gaming provider may specify VMs, dedicated processing power, amount of memory, etc. from a cloud service provider and instantiate a distributed cloud gaming engine using the cloud service provider's systems.

In some implementations the library module and update handler can be one or more components or modules of a game engine. In some implementations, the library module and update handler can be separate components, or integrated. In some implementations the library module and update handler may operate as an addition to a game engine. In some implementations the game engine can be a distributed game engine, as noted above.

As noted, implementations of the disclosure can be applied to cloud gaming systems. One example of a cloud gaming system is the Playstation® Now cloud gaming system. In such a system, the client device can be a game console, such as a Playstation® 4 or Playstation® 5 game console, or may be another device such as a personal computer, laptop, tablet, cell phone, mobile device, etc.

Broadly speaking, to enable cloud gaming, several operations are performed by one or more servers within a data center associated with a cloud gaming site when a user request is received for a game title. When the cloud gaming site receives a user request, a data center hosting the game associated with the selected game title is identified and the request is sent to the identified data center for instantiating the game for the selected game title. In response to the request, a server at the data center identifies the game code, loads the identified game code and initializes the files related to the game code in preparation for presenting the game content to the user. Game data associated with a game can include generic game data and user specific game data. Therefore, initializing the files can include identifying, loading, and initializing both generic game data and user specific game data. Initializing generic game data may include initializing a graphics engine, installing graphics data, initializing sound files, installing art work, etc. Initializing user specific data may include locating, transferring, and installing user data, user history, game history, etc.

While the generic game data is being loaded and initialized, a "splash" screen may be provided for rendering at the client device. A splash screen may be designed to provide representative images of the game that is being loaded, to allow a user a preview of the type of game that is being loaded. Once the generic game data is loaded, certain initial content may be rendered and a selection/navigation screen may be presented for user selection and customization. User selection input provided at the selection/navigation screen may include game level selection, game icon(s) selection, game mode selection, game winnings, and other user-related data that may require uploading of additional game content. In some embodiments, game content is made available by streaming the game content from the game cloud system to a user's computing device for viewing and interacting. In some implementations, after loading user specific data, the game content is available for game play.

Figure 9A:
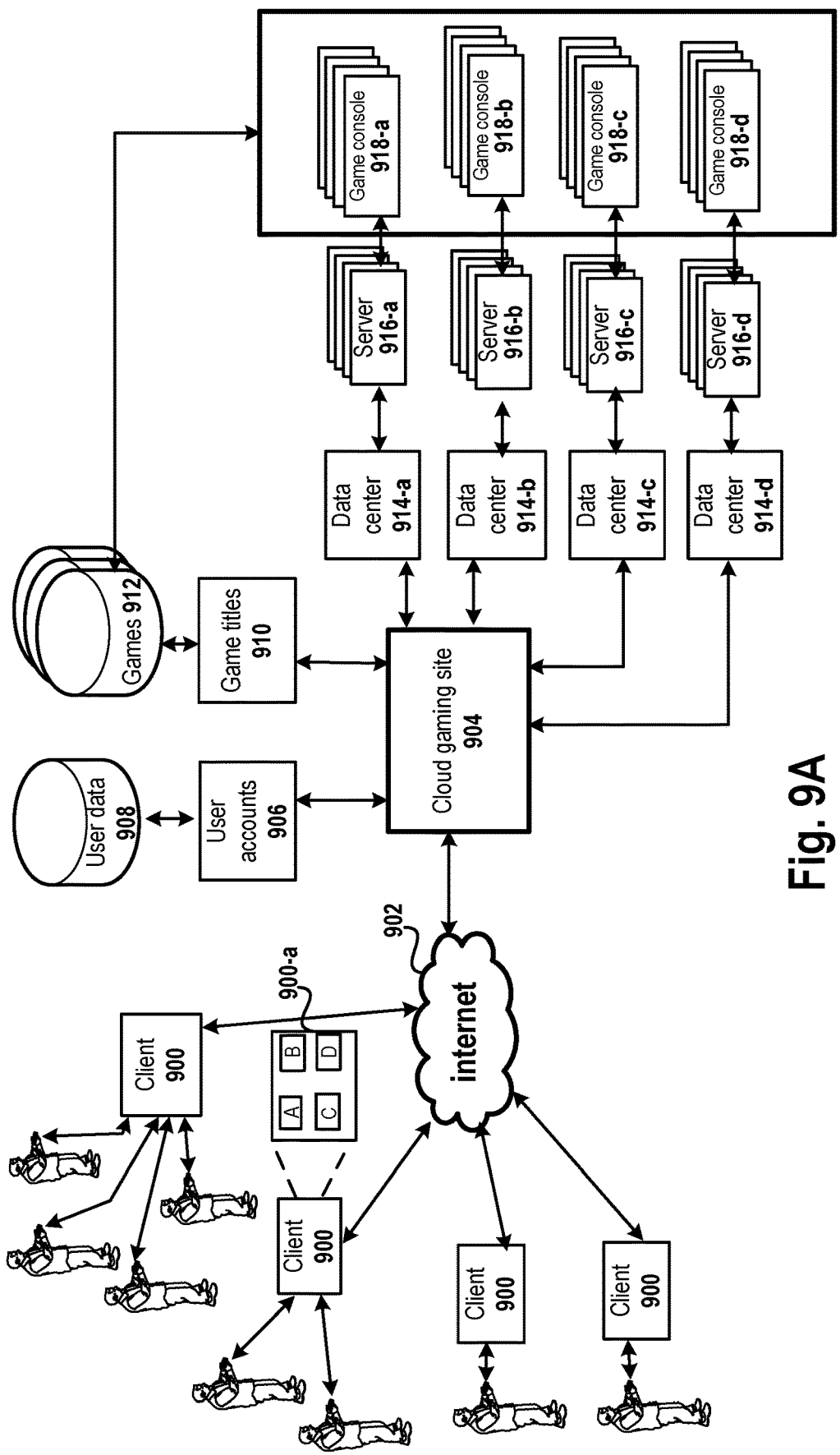
FIG. 9A illustrates an exemplary system used to load game files for a game available through a cloud gaming site, in accordance with implementations of the disclosure.

FIG. 9A illustrates an exemplary system used to load game files for a game available through a cloud gaming site. The system includes a plurality of client devices 900 that are communicatively connected to the cloud gaming site 904 over a network 902, which can include a LAN, wired, wireless, cellular (e.g. 4G, 5G, etc.), or any other type of data network, including the Internet. When a request to access the cloud gaming site 904 is received from a client device 900, the cloud gaming site 904 accesses user account information 906 stored in a user data store 908 to identify a user associated with a client device through which the request is initiated. In some embodiments, the cloud gaming site may also validate the identified user in order to determine all the games the user is authorized to view/play. Following user account identification/validation, the cloud gaming site accesses a game titles data store 910 to identify the game titles that are available at the game cloud site for the user account initiating the request. The game titles data store 910, in turn, interacts with a games database 912 to obtain the game titles for all the games that are available for the cloud gaming site. As new games are introduced, the games database 912 will be updated with the game code and the game titles data store 910 will be provided with game titles information for the newly introduced games. The client device from where the request is initiated may or may not be registered with the cloud gaming site, when the request was initiated. If the user of the client device initiating the request is not a registered user, then the cloud gaming site may identify the user as a new user and select the game titles (for e.g., a default set of game titles) that are appropriate for a new user. The identified game titles are returned to the client device for presenting on a display screen 900-a, as shown in FIG. 9A.

User interaction at one of the game titles rendered on the client device is detected and a signal is sent to the cloud gaming site. The signal includes the game title information where the user interaction was detected and the user interaction registered at the game title. In response to the signal received from the client device, the cloud gaming site proactively determines a data center where the game is being hosted and sends a signal to the identified data center to load the game associated with the game title for which the user interaction is detected. In some embodiments, more than one data center may be hosting the game. In such embodiments, the cloud gaming site may determine the geo location of the client device initiating the request and identify a data center that is geographically close to the client device and signal the data center to pre-load the game. The geo location of the user may be determined using a Global Position System (GPS) mechanism within the client device, the client's IP address, the client's ping information, to name a few. Of course, the aforementioned ways to detect the geo location of the user may be exemplary and other types of mechanisms or tools may be used to determine the geo location of the user. Identification of a data center that is close to the client device can minimize latency during user interaction with the game. In some embodiments, the identified data center may not have the required bandwidth/capacity to host the game or may be overused. In these embodiments, the cloud gaming site may identify a second data center that is geographically close to the client device. The loading of the game includes loading game code and executing an instance of the game.

In response to receiving the signal from the cloud gaming site, the identified data center may select a server at the data center to instantiate the game on the server. The server is selected based on the hardware/software capabilities available and the game requirements. The server may include a plurality of game consoles and the server may determine which one of the plurality of game consoles to use to load the game. The game console may be similar to an independent game console, or may be a rack-mounted server or a blade server. The blade server, in turn, may include a plurality of server blades with each blade having required circuitry for instantiating a single dedicated application, such as the game. Of course, the game console described above is exemplary and should not be considered restrictive. Other types of game consoles, including game stations, etc., and other forms of blade server may also be engaged for hosting the identified game.

Once the game console is identified, the generic game-related code for the game is loaded onto the game console and a signal is returned to the client device via the cloud gaming site over the network identifying the game console on which the game is instantiated. The loaded game is thus made available to the user.

Figure 9B:
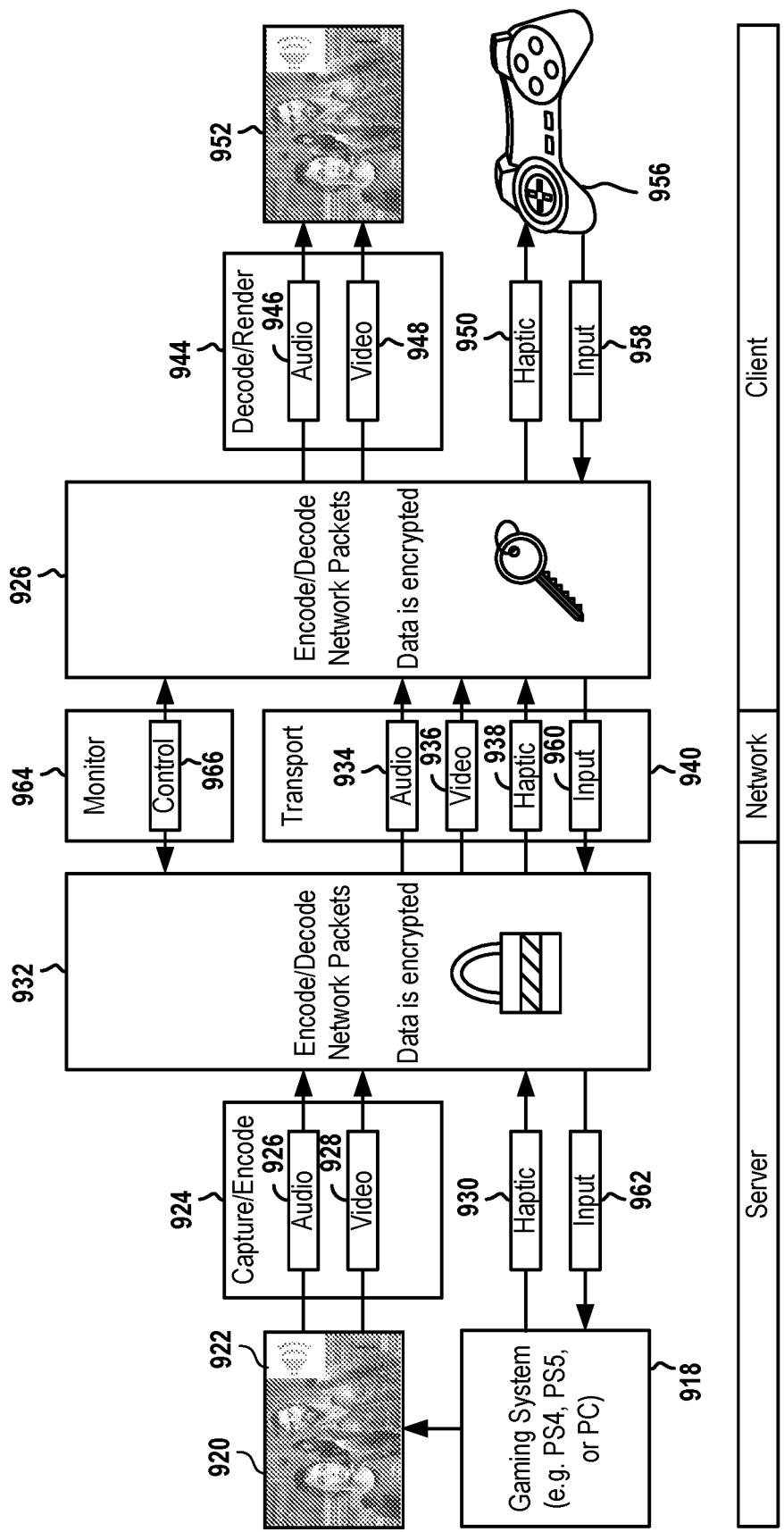
FIG. 9B is a flow diagram conceptually illustrating various operations which are performed for streaming a cloud video game to a client device, in accordance with implementations of the disclosure.

FIG. 9B is a flow diagram conceptually illustrating various operations which are performed for streaming a cloud video game to a client device, in accordance with implementations of the disclosure. The gaming system 918 executes a video game and generates raw (uncompressed) video 920 and audio 922. The video 920 and audio 922 are captured and encoded for streaming purposes, as indicated at reference 924 in the illustrated diagram. The encoding can provide for compression of the video and audio streams to reduce bandwidth usage and optimize the gaming experience. Examples of encoding formats include H.265/MPEG-H, H.264/MPEG-4, H.263/MPEG-4, H.262/MPEG-2, WMV, VP6/7/8/9, etc.

The encoded audio 926 and encoded video 928 are further packetized into network packets, as indicated at reference numeral 932, for purposes of transmission over a network such as the Internet. The network packet encoding process can also employ a data encryption process, thereby providing enhanced data security. In the illustrated implementation, audio packets 934 and video packets 936 are generated for transport over the network, as indicated at reference 940.

The gaming system 918 additionally generates haptic feedback data 930, which is also packetized into network packets for network transmission. In the illustrated implementation, haptic feedback packets 938 are generated for transport over the network, as further indicated at reference 940.

The foregoing operations of generating the raw video and audio and the haptic feedback data, encoding the video and audio, and packetizing the encoded audio/video and haptic feedback data for transport are performed on one or more servers which collectively define a cloud gaming service/system. As indicated at reference 940, the audio, video, and haptic feedback packets are transported over a network, such as and/or including the Internet. As indicated at reference 942, the audio packets 934, video packets 936, and haptic feedback packets 938, are decoded/reassembled by the client device to define encoded audio 946, encoded video 948, and haptic feedback data 950 at the client device. If the data has been encrypted, then the network packets are also decrypted. The encoded audio 946 and encoded video 948 are then decoded by the client device, as indicated at reference 944, to generate client-side raw audio and video data for rendering on a display device 952. The haptic feedback data 950 can be processed/communicated to produce a haptic feedback effect at a controller device 956 or other interface device through which haptic effects can be rendered. One example of a haptic effect is a vibration or rumble of the controller device 956.

It will be appreciated that a video game is responsive to user inputs, and thus, a similar procedural flow to that described above for transmission and processing of user input, but in the reverse direction from client device to server, can be performed. As shown, a user operating controller device 956 may generate input data 958. This input data 958 is packetized at the client device for transport over the network to the cloud gaming system. The input data packets 960 are unpacked and reassembled by the cloud gaming server to define input data 962 on the server-side. The input data 962 is fed to the gaming system 918, which processes the input data 962 to update the game state of the video game.

During transport (ref. 940) of the audio packets 934, video packets 936, and haptic feedback packets 938, the transmission of data over the network can be monitored to ensure the cloud game stream quality of service. For example, network conditions can be monitored as indicated by reference 964, including both upstream and downstream network bandwidth, and the game streaming can be adjusted in response to changes in available bandwidth. That is, the encoding and decoding of network packets can be controlled based on present network conditions, as indicated by reference 966.

Figure 10:
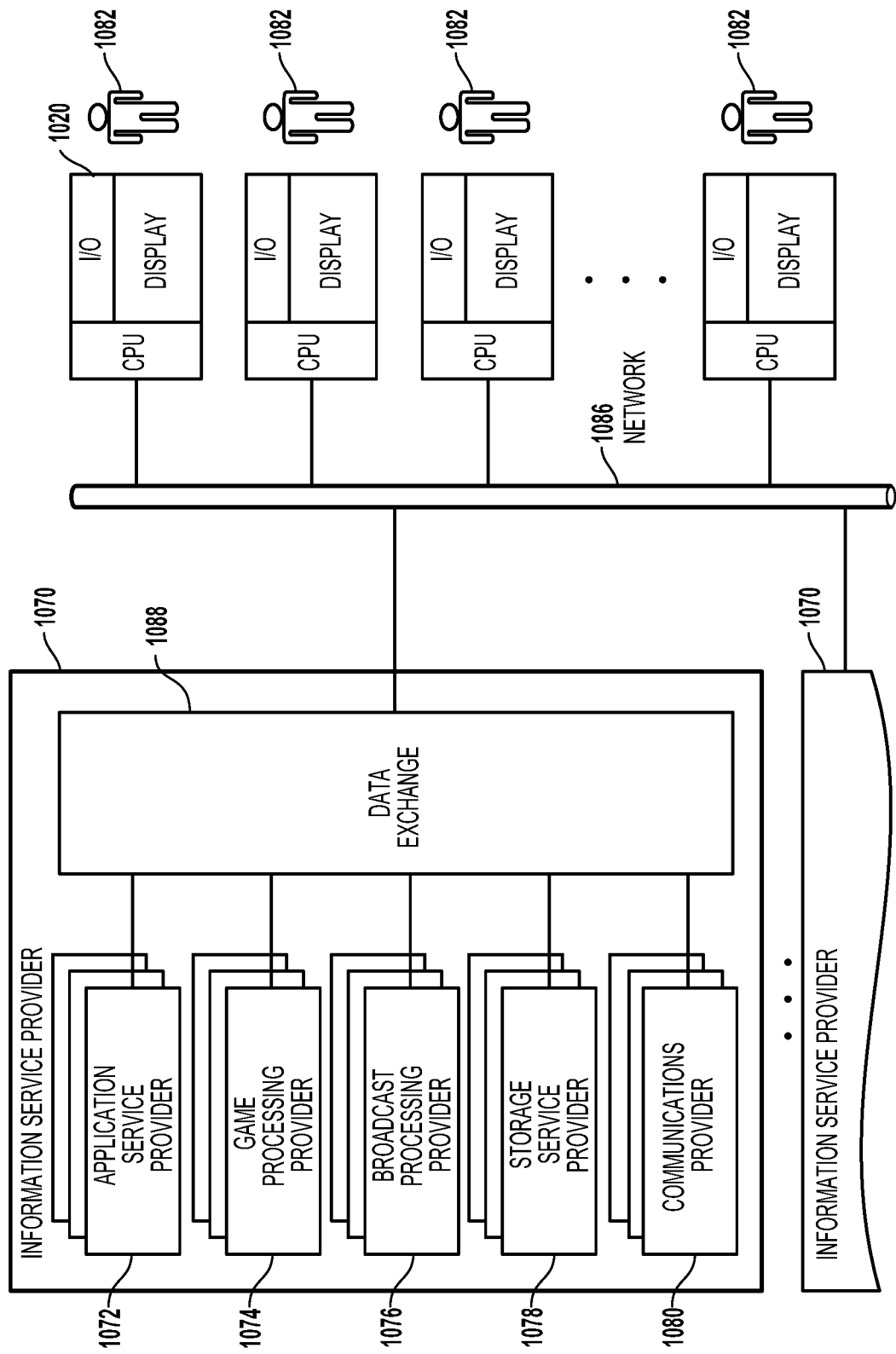
FIG. 10 illustrates an embodiment of an Information Service Provider architecture, in accordance with implementations of the disclosure.

FIG. 10 illustrates an embodiment of an Information Service Provider architecture. Information Service Providers (ISP) 1070 delivers a multitude of information services to users 1082 geographically dispersed and connected via network 1086. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 1070 includes Application Service Provider (ASP) 1072, which provides computer-based services to customers over a network (e.g. including by way of example without limitation, any wired or wireless network, LAN, WAN, WiFi, broadband, cable, fiber optic, satellite, cellular (e.g. 4G, 5G, etc.), the Internet, etc.). Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 1070 includes a Game Processing Server (GPS) 1074 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 1076 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 1078 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 1080 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 1088 interconnects the several modules inside ISP 1070 and connects these modules to users 1082 via network 1086. Data Exchange 1088 can cover a small area where all the modules of ISP 1070 are in close proximity, or can cover a large geographic area when the different modules are geographically dispersed. For example, Data Exchange 1088 can include a fast Gigabit Ethernet (or faster) within a cabinet of a data center, or an intercontinental virtual area network (VLAN).

Users 1082 access the remote services with client device 1084, which includes at least a CPU, a memory, a display and I/O. The client device can be a PC, a mobile phone, a netbook, tablet, gaming system, a PDA, etc. In one embodiment, ISP 1070 recognizes the type of device used by the client and adjusts the communication method employed. In other cases, client devices use a standard communications method, such as html, to access ISP 1070.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. Alternately, the computer readable code may be downloaded from a server using the data exchange interconnects described above. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the described embodiments.

What is claimed is:

1. A method for inserting a virtual object into an augmented reality environment, comprising:
   capturing one or more images of a real world object;
   processing the one or more images to identify a type of the real world object;
   based on the identified type of the real world object, generating a virtual object that resembles the real world object;
   using the identified type of the real world object to assign a functionality to the virtual object, the functionality defining a utility of the virtual object in an augmented reality environment, wherein assigning the functionality enables an action capable of being performed by the virtual object in the augmented reality environment that provides said utility;
   deploying the virtual object in the augmented reality environment.

2. The method of claim 1, wherein the one or more images of the real world object include images from multiple angles surrounding the real world object.

3. The method of claim 1, wherein the capturing one or more images is performed by a camera of a handheld device.

4. The method of claim 1, wherein the capturing one or more images is performed by a camera of a head-mounted display (HMD).

5. The method of claim 1, wherein processing the one or more images to identify the type of the real world object includes applying a machine learning model to recognize the type of the real world object based on the one or more images.

6. The method of claim 1, wherein generating the virtual object includes obtaining a 3D model for the identified type of the real world object.

7. The method of claim 6, wherein generating the virtual object includes applying features of the real world object to the 3D model.

8. The method of claim 1, wherein assigning the functionality to the virtual object includes defining a mapping of the functionality to an input device to activate the functionality, such that triggering the input device causes performance of the action by the virtual object.

9. The method of claim 1, wherein deploying the virtual object in the augmented reality environment includes receiving user input to determine a location in the augmented reality environment where the virtual object is placed.

10. The method of claim 1, wherein deploying the virtual object in the augmented reality environment includes receiving user input to determine a size of the virtual object in the augmented reality environment.

11. The method of claim 1, wherein the augmented reality environment is of a video game or of a simulation.

12. A method for inserting a virtual object into an augmented reality environment, comprising:
    receiving a drawing of a real world object;
    processing the drawing to identify a type of the real world object;
    based on the identified type of the real world object, generating a virtual object that resembles the real world object;
    using the identified type of the real world object to assign a functionality to the virtual object, the functionality defining a utility of the virtual object in an augmented reality environment, wherein assigning the functionality enables an action capable of being performed by the virtual object in the augmented reality environment that provides said utility;
    deploying the virtual object in the augmented reality environment.

13. The method of claim 12, wherein receiving the drawing of the real world object includes receiving touchscreen input that creates the drawing.

14. The method of claim 12, wherein processing the drawing to identify the type of the real world object includes applying a machine learning model to recognize the type of the real world object based on the drawing.

15. The method of claim 12, wherein generating the virtual object includes obtaining a 3D model for the identified type of the real world object.

16. The method of claim 12, wherein assigning the functionality to the virtual object includes defining a mapping of the functionality to an input device to activate the functionality, such that triggering the input device causes performance of the action by the virtual object.

17. The method of claim 12, wherein deploying the virtual object in the augmented reality environment includes receiving user input to determine a location in the augmented reality environment where the virtual object is placed.

18. The method of claim 12, wherein deploying the virtual object in the augmented reality environment includes receiving user input to determine a size of the virtual object in the augmented reality environment.

19. The method of claim 12, wherein the augmented reality environment is of a video game or of a simulation.

20. The method of claim 12, wherein receiving the drawing includes capturing an image of the drawing by a camera of a head-mounted display (HMD) or a hand-held device;

wherein processing the drawing includes processing the image to identify the type of the real world object.

* * * * *